United States Patent [19]

Cochrane

[11] 4,110,572

[45] Aug. 29, 1978

[54] METHOD AND APPARATUS FOR TESTING TRANSMISSION LINES

[75] Inventor: Peter Cochrane, Ipswich, England

[73] Assignee: The Post Office, London, England

[21] Appl. No.: 803,964

[22] Filed: Jun. 6, 1977

[30] Foreign Application Priority Data

Jun. 8, 1976 [GB] United Kingdom .............. 23599/76

[51] Int. Cl.² ............................................. H04B 3/46
[52] U.S. Cl. ...................... 179/175.3 R; 179/175.3 F; 324/52
[58] Field of Search .................. 179/175.3 R, 175.3 F, 179/175.31 E; 324/52, 58.5 B, 58 B

[56] References Cited

U.S. PATENT DOCUMENTS

| 3,244,975 | 4/1966 | Bauer | 324/52 |
| 3,255,406 | 6/1966 | Schluter | 324/52 |
| 3,492,464 | 1/1970 | Hill et al. | 324/52 |
| 3,753,086 | 8/1973 | Shoemaker | 324/52 |
| 3,911,358 | 10/1975 | Shalyt et al. | 324/52 |
| 4,041,381 | 8/1977 | Hwa | 179/175.3 F |

Primary Examiner—Douglas W. Olms
Attorney, Agent, or Firm—Hall & Houghton

[57] ABSTRACT

A method and apparatus for testing for forward echoes produced by signal transmission through a length of transmission line in which a succession of 1 ns pulses are applied to the line and the outward signals are multiplied by pulses delayed by a succession of discrete delay times. The products resulting from 65,500 pulses subjected to the same delay are integrated to eliminate the effects of thermal noise and the results for different delay times plotted against the delay time to produce a correlation curve in which the echoes appear as perturbations on the curve.

18 Claims, 4 Drawing Figures

FIG. I.

METHOD AND APPARATUS FOR TESTING TRANSMISSION LINES

This invention relates to a method and apparatus for testing transmission lines and is particularly, but not exclusively, suited to the testing of relatively long sections (1 to 2 km) of coaxial cable.

In long distance transmission using transmission lines a problem which arises is the generation of forward echoes as a result of discontinuities in the impedance of the lines. A forward echo takes the form of a spurious signal of form similar to the signal to be transmitted which follows that signal at the remote end of the line. The interval between the signal and its echo depends on the position of the discontinuities in the line, and it is desirable to be able to detect the presence of these forward echoes in order to assess the transmission capabilities of a given transmission line and make suitable allowances in the design of the system for impairment of a signal transmitted along the line.

It is an object of the present invention to enable the testing of a transmission line to be carried out to detect the presence of such impedance discontinuities.

According to the first aspect of the invention there is provided a method of testing a section of transmission line including the following steps:—applying a succession of input signals to one end of the section of line, deriving a succession of output signals from the same or the other end of the section of line, producing variably delayed replicas of the input signals, forming the products of the output signals with the replicas of the respective input signals from which they are derived, integrating the products with respect of time to produce correlations of the output signals and the delayed replicas of the input signals, and examining the correlations resulting from the integration for peaks representing echoes resulting from transmission of the input signals along the section of line.

According to a second aspect of the invention there is provided apparatus for testing a section of transmission line including means for connection to one end of the section for generating a succession of input signals, means for connection to an end of the section for deriving therefrom a succession of output signals corresponding respectively to the input signals, means for producing replicas of the input signals subject to an adjustable time delay, means for forming the products of the replicas of the input signals with corresponding output signals, means for integrating the products with respect to time to produce correlations of the output signals with the delayed replicas of the input signals corresponding to each of a plurality of different time delays, and means for producing output indications representing the correlations.

The input signals may take the form of a succession of pulses of short duration, e.g. of the order of 1 ns and of amplitude, say, 50 or 100 volts. At each of a succession of delay times the output signals, resulting from, say, several thousand input signals, are summed (integrated) to produce total values which can be plotted against the corresponding delay times giving a correlation curve which includes the peaks representing echoes. Both forward echoes and reflected echoes can be investigated. The integration may be performed digitally by summing numbers representing products or by analogue techniques, for example by feeding quantities of electricity representing the products to a capacitor.

If forward echoes are to be measured, the section of transmission line to be tested may be arranged to provide an out and back path for the signals or the line to be tested may provide the transmission in the return direction and a line provided to convey the input signal to the far end of the line, with or without a pulse regenerator at the far end. On the other hand, if reflected echoes are to be measured the input signals would be applied to one end of the line and the output signals derived from the same end using a suitable hybrid circuit such as a reflectometer bridge.

In order that the invention may be fully understood and readily carried into effect it will now be described with reference to the accompanying drawings, of which:

Figure 1:
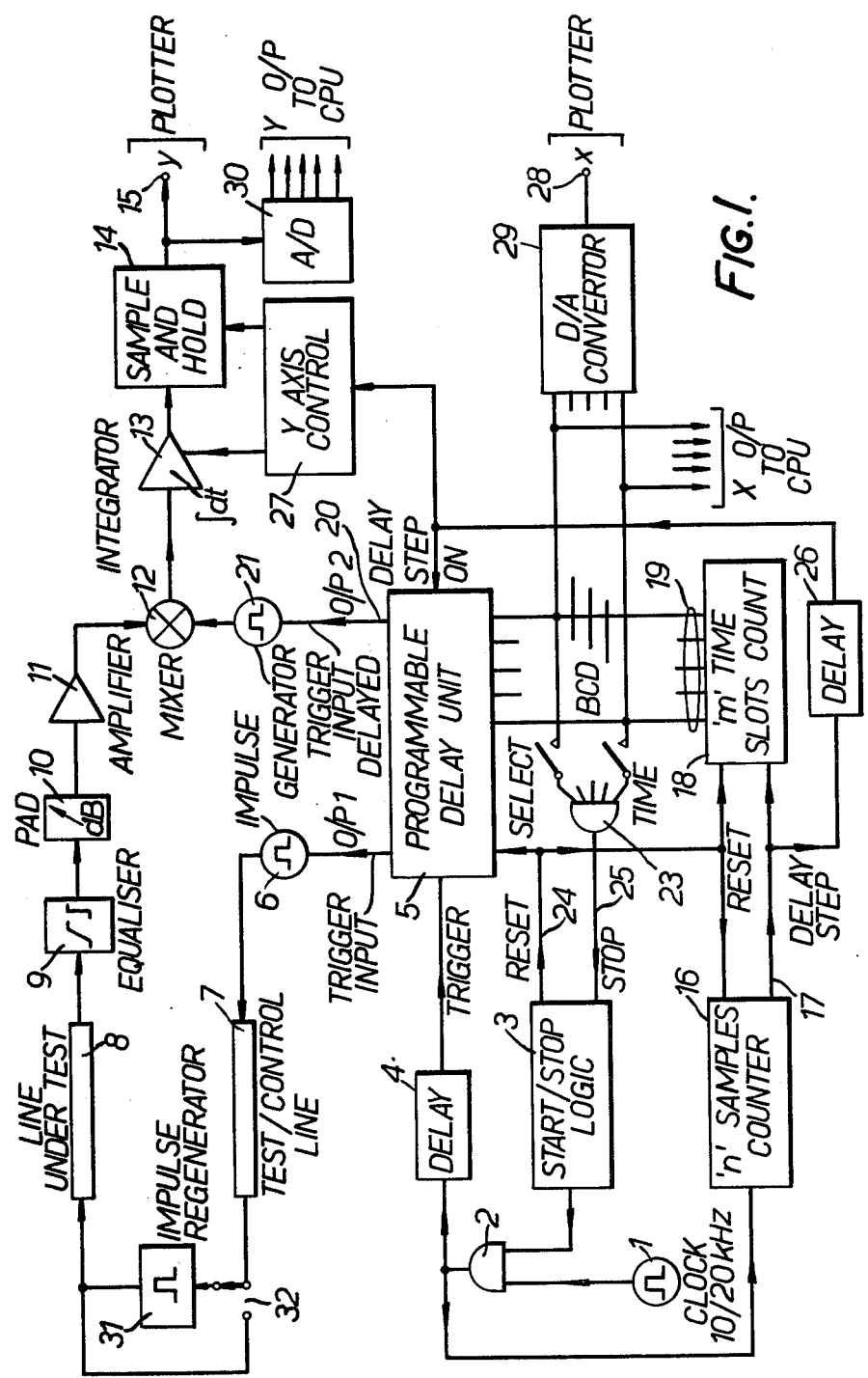
FIG. 1 is a diagram illustrating one example of apparatus according to the invention for measuring forward echoes.

Referring now to FIG. 1, clock pulses from a clock 1 are applied through an AND-gate 2 controlled by a start/stop logic unit 3 and a delay element 4 to trigger a programmable delay unit 5. The unit 5 has an undelayed output which is connected to drive an impulse generator 6 which produces in response to each clock pulse an impulse of duration 1 ns and an amplitude 50 volts, which impulses are applied through a test/control line 7 to the remote end of a section 8 of coaxial transmission line to be tested. The output of the line section 8 is applied via an equaliser 9, an attenuating pad 10 and an amplifier 11 to one input of a multiplier or mixer 12. The product output of the multiplier 12 is applied to an integrator 13 from which the integrand signal is connected via a sample and hold circuit 14 to an output connection 15.

The clock pulse signals from the clock 1 are also applied to a counter 16 which is arranged to produce an output pulse on a conductor 17 every $n$th clock pulse. The conductor 17 is connected to an input of a counter 18 which produces a binary coded decimal (BCD) output in parallel on a group 19 of conductors. The conductors 19 are connected to inputs of the programmable delay unit 5 to set the delay of the unit, the delayed output appearing on a conductor 20 and being connected to trigger a second impulse generator 21 to cause it to generate 1 ns pulses, which are applied to a second input of the multiplier 12.

The conductors 19 are also connected through a group of switches 22, set in accordance with a desired value of "$m$", which is defined later, to inputs of an AND-gate 23. The output of the gate 23 is connected to a "stop" input 25 of the start/stop logic 3 to cause that unit to disable the gate 2 and terminate the flow of clock pulses to the delay unit 4 and the counter 16. Resetting signals are generated by the start/stop logic 3 at this time on a conductor 24 and are applied to reset the counters 16 and 18 to zero and the delay units to a datum value.

In order to avoid possible difficulty due to the programmable delay unit 5 responding to intermediate states of the counter 18 as it changes from one value to the next, the conductor 17 is connected to a delay unit 26 from which delay pulses are applied to an input of the unit 5 to cause it to respond to a new value from the counter 18.

The delayed pulses from the unit 26 are also applied to a Y-axis control circuit 27 used to reset the integrator 13 after the integrand has been sampled and stored by the sample and hold unit 14, the circuit 27 also controlling the sampling and resetting the holding circuit in the unit 14.

A convenient way of displaying the results obtained by the apparatus is to use an X-Y plotter and the terminal 15 can be connected directly to the Y-input of such a plotter. The X-input of the plotter may be connected to a terminal 28 at the output of a digital to analogue converter 29 having the conductors 29 connected to its input.

If further processing of the results is required the conductors 19 can be used to provide a suitable X output in digital form. The Y output at the terminal 15 is in analogue form but may be converted to digital form by a suitable analogue to digital converter 30. If desired the integrator 13 could be replaced by a digital integrator with a suitable analogue to digital converter, which could possibly be simplified to be merely a Schmitt trigger, connected in its input circuit.

If the line 8 to be tested is relatively short, for example, less than 500 meters in length, then the amplitude of the impulses applied to its input from the test/control line 7 is likely to be adequate without regeneration. However, for longer lengths of line an impulse regenerator will probably be required. In order to achieve this regeneration when required a regenerator 31 is provided with a switch 32 connected to apply the output of the line 7 either directly to the input of the line 8 or to trigger the regenerator the output of which is connected to the input of the line 8.

In one example of apparatus according to the invention the repetition rate of the clock pulses produced by the clock 1 was 10 kHz for a line 8 of length 2 km and 20 kHz for a line 8 length 1 km. The longer the length of the section 8 of transmission line under test the lower the rate of the clock pulses because of the greater length of time over which forward echoes may be produced as the length of the section of line is increased, and it is undesirable for the output signal from a second impulse to be mixed up with the forward echoes resulting from a first impulse. The delay circuit 4 is provided to delay the clock pulses to allow any changes to the delay provided by the programmable delay circuit 5 to have been completed. When the delay circuit 5 is set to its minimum or datum value, the circuit is arranged so that the impulse arriving at the multiplier 12 from the generator through the sections 7 and 8 of transmission line and the equaliser 9, pad 10 and amplifier 11 does so at the same time as the impulse from the generator 21 reaches the multiplier 12. Because of the short duration of the impulses from the generators 6 and 21 differences between the forms of the impulses from the two generators do not have as much effect on the validity of the correlation as they would if the pulses were of longer duration.

The number $n$, counted by the counter 16 and determining the number of pulses to be applied to the counter 16 to produce a single output pulse, defines the number of samples integrated by the integrator 13 for each delay time. It has been found in practice that to reduce the masking effect of thermal noise sufficiently to enable the echoes to be detected satisfactorily $n$ should have a typical value of 65,500 which means that the integration time for each delay time should be about 6½ seconds using a 10 kHz pulse rate, or 0.65 seconds using a 100 kHz pulse rate. To achieve this the counter 16 may be a binary counter of 16 stages.

It has been found practical to increment the delay time produced by the programmable delay unit 5 in 1 ns steps, the number of steps, i.e. the value of $m$, being dependent on the length of line being tested, since the echoes produced in a longer line will continue for a longer time after the main signal pulse is received. With a line 1 km long, the transmission delay is about 3.6 μs and echo components only decay significantly after a further 1.0 μs. This means that 1000 delay times should be used and therefore 1000 integrations would be required, giving a total time for obtaining the measurements from a line of about 10 minutes. For the programmable delay unit 5 a programmable digital delay generator type 7030 produced by Berkeley Nucleonics Corporation, California, has been found suitable.

In the operation of the circuit of FIG. 1, initially the counters 16 and 18 are reset to zero and the integrator 13 is assumed to have no residual voltage stored. Each clock pulse after passage through the delay unit 4 triggers the generator 6 which produces a 50 volt 1 ns pulse which is applied to the end of the test/control line 7, thus causing an impulse to be applied to the left-hand end of the line 8 to be tested. As explained above, if the lengths of the lines 7 and 8 are sufficiently long the regenerator 31 will be used to reform the pulses before they are applied to the line 8. The output signals obtained from the line 8 in response to the impulses are applied to an input of the multiplier 12 where they are multiplied by an impulse similar to that produced by the generator 6 but produced by the generator 21 at a time determined by the delay set up in the programmable delay unit 5 in response to the setting of the counter 18. Initially the counter 18 will store zero but the unit 5 will be set to a datum value to allow for the propagation delay of the impulse through the lines 7 and 8 and the components 9, 10 and 11. Whilst the delay imposed by the unit 5 is maintained at its minimum value corresponding to a zero output from the counter 18, $n$ impulses are applied to the line 8 and the corresponding products from the multiplier 12 are integrated in the integrator 13. As explained above, a typical value for $n$ is $6.55 \times 10^4$, and this relatively large number of impulses is required to reduce the effect of thermal noise which will be cancelled out because of its random nature during such a large number of signals, so that the relatively small echo signals which are to be detected can be more readily discovered. At the $n^{th}$ clock pulse the counter 16 will produce an output on the conductor 17 which steps the value of $m$ stored by the counter 18 on to 1, and after a delay imposed by the unit 26 causes the unit 5 to increment the delay which it imposes on the output produced on the conductor 20 by 1 ns. The integrand from the integrator 13 is sampled by the sample and hold circuit 14 and the value held for application to the terminal 15 for the X-Y plotter. Immediately after the sampling the integrator 13 is reset ready for the next integration. A further $n$ impulses are now applied to the line 8 and the resulting products integrated in the integrator 13. The integrations of $n$ samples are performed using progressively increasing delays in the unit 5, the delay being incremented by 1 ns at each time, and the corresponding integrands presented at the terminal 15 for plotting on the X-Y plotter. The X input of the plotter is derived from the output of the counter 18 using the digital to analogue converter 29 which converts the binary coded decimal output of the counter 18 to analogue form. When the number of integrations is equal to that set up on the switches 22, the gate 23 produces a "stop" signal which causes the logic unit 3 to close the gate 2 and terminate the application of clock pulses to the delay unit 4 on the counter 16.

Figure 2:
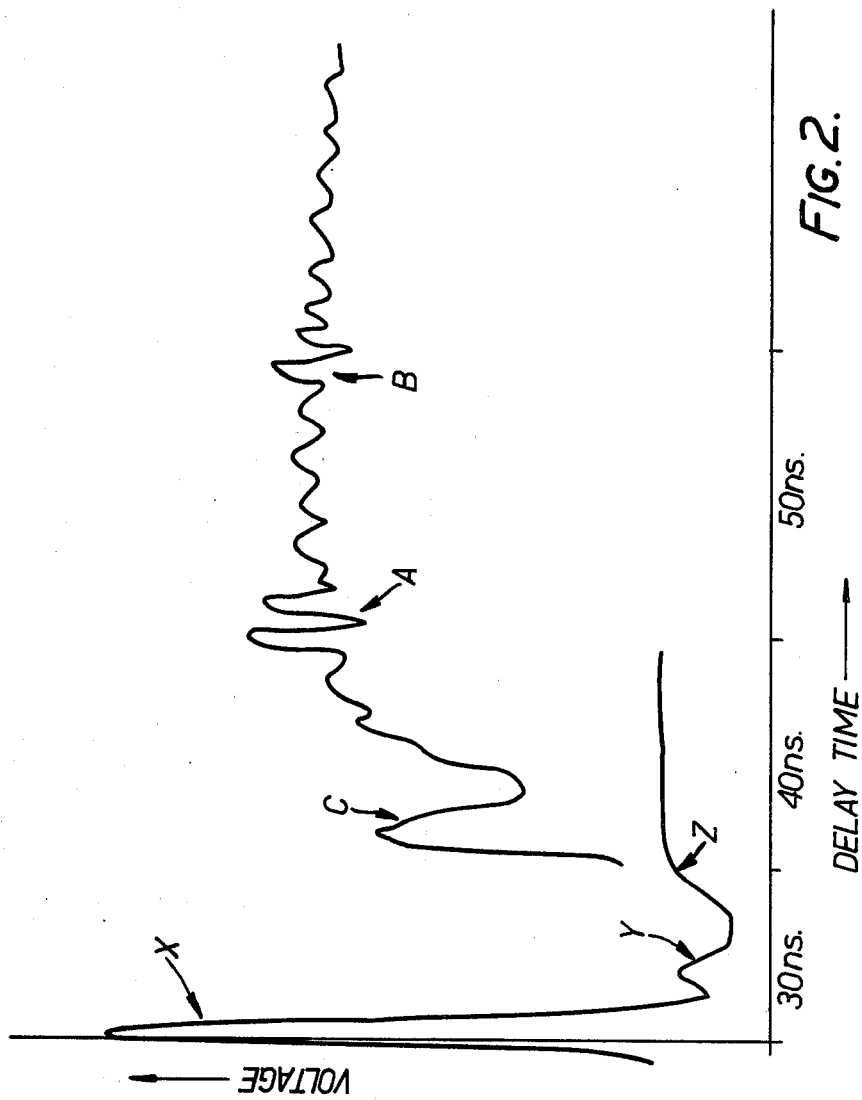
FIG. 2 shows an example of the results obtainable from the apparatus of FIG. 1.

FIG. 2 shows a plot obtained on an X-Y plotter by means of the apparatus shown in FIG. 1. In FIG. 2 the pulse at X is the form of the impulse as it appears at the output of the amplifier 11 after transmission through the line 8. The overshoot indicated at Y is the result of the imperfect equalisation of the response of the line 8 by the equaliser 9. At the point Z, because the high amplitude signals are past the gain of the amplifier 11 is increased by a factor of 100, so that the magnitude of the display is amplified by a factor of 100 by introducing a suitable amplifier in the output of the sample and hold circuit 14. For clarity the magnified plot is subjected to an offset so that it can be displayed together with the earlier part of the signal without confusion. The magnified part of the waveform includes a number of small oscillations corresponding to periodic echo components but at A and B two larger echoes are shown which correspond to specific discontinuities in the cable, which in the particular cable being tested were caused by gas block-back joints. The echo shown at C is due to a similar cause. On the basis of the plot shown in FIG. 2 an engineer would be able to calculate the position of the discontinuities causing the echoes and either rectify the cause or decide on the basis of the amplitude of the echoes whether or not any rectification action will be required. The plot shown in FIG. 2 is based on samples taken at 1 ns spacings of the delay units so that some 120 points are plotted between the pulse X and the pulse B.

In one example of the apparatus shown in FIG. 1, the programmable delay unit 5 was a commercially available unit type 7030 produced by Berkeley Nucleonics Corporation, as mentioned above, the integrator 13 was constructed from a Philbrick Nexus integrated circuit type 4850, and the sample and hold unit 14 was a Computing Techniques type SA-7. The digital to analogue converter 29 was a datel DAC 9, and the plotter used was a Bryans Southern Instruments X-Y plotter. The mixer or multiplier 12 would be any suitable analogue multiplier having an adequate frequency response. The counter 16 was 16-stage binary counter, and the counter 18 a suitable BCD counter.

The frequency response of the line 8 is such that its output is progressively reduced as the frequency increases, and therefore to restore a substantially constant amplitude response over a wide frequency range up to, for example, 500 MHz, the equaliser 9 is provided having a frequency characteristic which is intended to compensate for that of line 8. Any suitable form of equaliser could be employed, but that adopted for the example of the apparatus being described used a 75% raised cosine amplitude response.

The impulse generators 6 and 21 and the impulse regenerator 31 use transistor pulse amplifiers operating in the avalanche mode, and an example of such an amplifier will be described with reference to FIG. 4.

The basis of the invention lies in the cross correlation function which may be expressed as $$\int_{-\infty}^{+\infty} m(t) \cdot g(t-\tau) dt$$

where
$m(t) = g(t) * h(t)$ the convolution of $g(t)$ and $h(t)$
and
$g(t)$ = the impulse function from the generator 6
$h(t)$ = the transient response of the transmission line under test
$g(t-\tau)$ = the impulse function delayed by a time $\tau$ which is the delay imposed by the programmable delay 5 less the delay imposed by the delay circuit 4.

It can be shown that the cross correlation function has peaks as $\tau$ is varied which correspond to the times of occurrence of the forward echoes and the apparatus described above enables these times of occurrence to be measured accurately. With an impulse duration of 1 ns, as described in the example above, the programmable delay circuit 5 may be arranged to step in increments of 1 ns as the output of the divide-by-$m$ circuit 18 changes. It has been found in practice that the programmable delay unit 5 need not produce a continuously variable delay, but that a discretely variable delay is adequate providing that the increments are sufficiently small. It has been found that the interval between forward echoes in one sample of transmission line was of the order of 5 ns and therefore increments of 1 ns in the delay unit 5 provide adequate resolution when used in conjunction with an impulse duration of 1 ns.

As described above the output connections 15 and 28 may be applied to a plotter to produce a graph of the value of the integrand plotted against the value of $\tau$. Such a graph will enable an operator to ascertain the times of occurrence of the forward echoes and the necessary remedial action to be taken. Alternatively the outputs in digital form may be coupled to a suitable digital processor to enable mathematical processing of the results to be carried out using, for example, a fast Fourier Transform, and the following information could be obtained from such a processor:

(1) the amplitude/frequency response of the transmission line
(2) the phase/frequency response of the transmission line (some minor modification of the circuitry may be required to achieve this)
(3) cross talk between different signals transmitted along the transmission line
(4) the occurrence of forward echoes related to their time of occurrence
(5) the occurrence of forward echoes related to signal frequency
(6) the signal/echo noise power figure over a given bandwidth.

One difficulty which has been referred to in connection with the apparatus already is the need for two impulse generators 6 and 21 which produce substantially identical impulses. As differences between impulses from the two generators will introduce measurement errors it is desirable that such impulses should be as closely similar as possible. One method of dealing with this problem would be to perform a calibration run without the test section of the transmission line in circuit and use this data for correction of the results of test of the transmission line itself. In addition there is a need for close tolerance line equalisers to ensure consistency of performance of the apparatus with different transmission lines.

Figure 3:
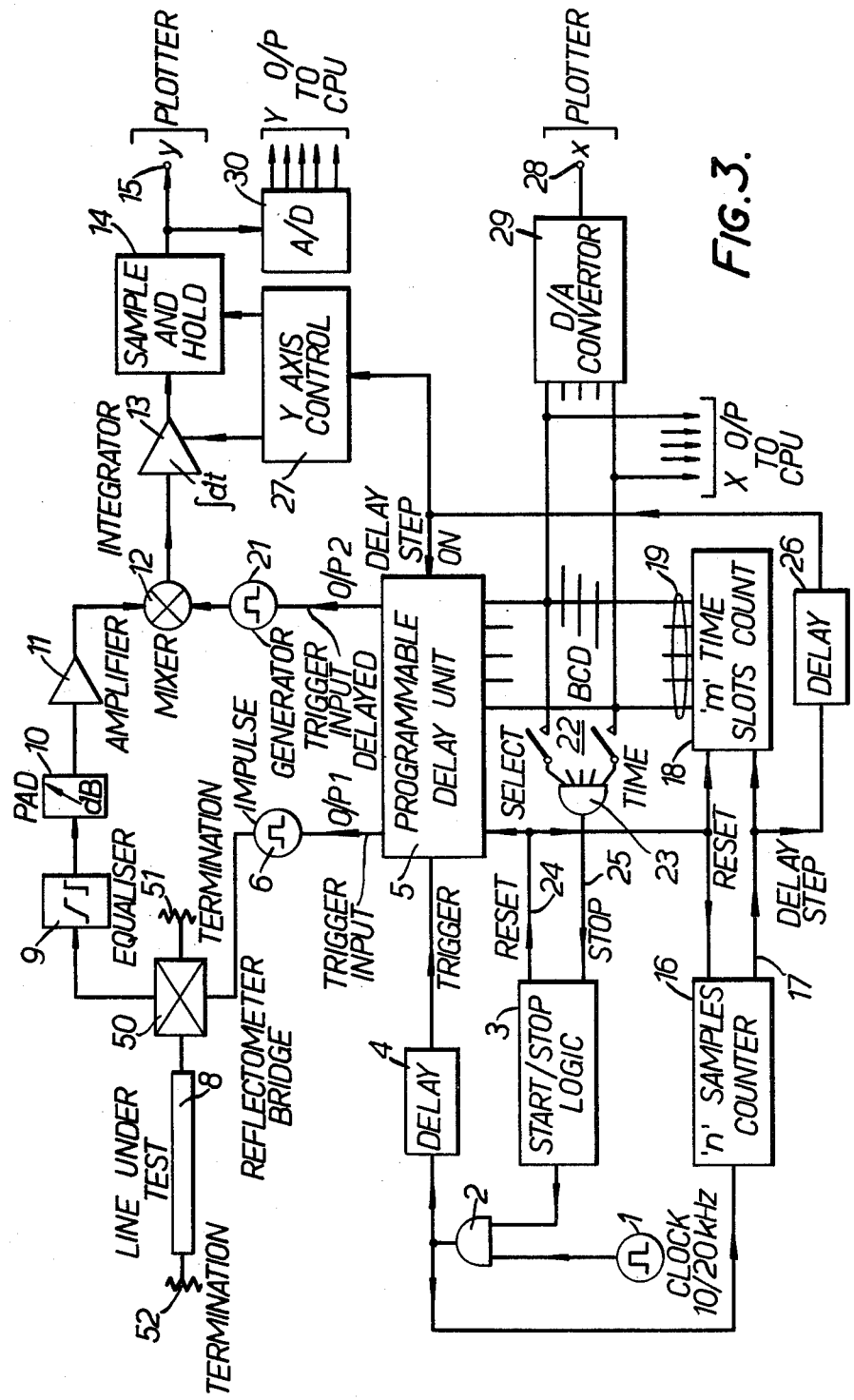
FIG. 3 shows a modification of the apparatus of FIG. 1 for measuring reflected echoes.

FIG. 3 shows a modification of the apparatus of FIG. 1 for measuring the return echoes generated in the section of line 8. Most of the apparatus of FIG. 3 is identical to that of FIG. 1 and corresponding components have the same reference numbers as in that Figure. However, the output of the impulse generator 6 is applied to the input of a reflectometer bridge 50 having one output connected to an end of the line 8 and another output connected to a matched termination 51. The remote end of the line 8 is terminated by a matched termination 52. The echoes reflected by discontinuities in the line 8 are directed by the bridge 50 to the input of the equaliser 9 and thereafter are treated in the same way as forward echoes are treated by the apparatus of FIG. 1. Since the operation of the apparatus of FIG. 3 is identical with that of FIG. 1 except for the different nature of the echoes, it is not proposed to describe the operation in detail.

With the apparatus set up as shown in FIG. 3 to measure the return echoes, it does so with a greater sensitivity and positional resolution than previously proposed apparatus. This improvement results from the signal averaging provided by the integrator 13 and the wide band equalisation provided by the equaliser 9. Both forward and return echoes can be measured and used together to locate discontinuities in a section of line.

Figure 4:
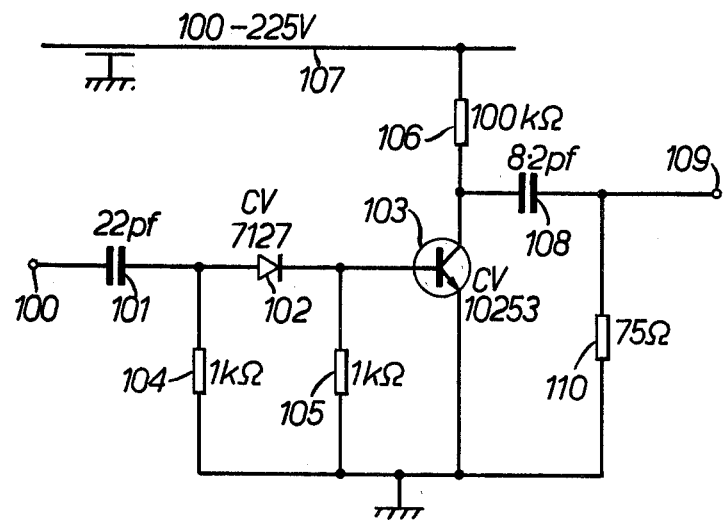
FIG. 4 is a diagram of a suitable impulse generator.

FIG. 4 is a diagram of an impulse generator suitable as components 6 and 21 and for use in the impulse re-generator 31 shown in FIG. 1. The circuit of FIG. 4 employs a type CV 10253 transistor connected as a conventional base driven amplifier operating in the avalanche mode. Trigger pulses for the transistor are applied to a terminal 100, which is connected via a capacitor 101 and a diode 102 of type CV 7127 to the base of the transistor 103. The junction of the capacitor 101 and the diode 102 is connected to earth through a 1 kΩ resistor 104 and the base of the transistor 103 is connected to earth through another 1 kΩ resistor 105. The emitter electrode of the transistor 103 is connected directly to earth. The collector of the transistor 103 is connected through a 100 kΩ load resistor 106 to a positive voltage supply rail having on it a voltage between 100 and 225 volts with respect to earth. The collector is also connected through an 8.2 pf capacitor 108 to an output terminal 109 which is connected to earth through a 75Ω resistor 110 which serves to match the impulse generator to the transmission line to be tested, which in the example under consideration is a 75Ω coaxial line.

It is not proposed to describe the operation of the impulse generator in detail since the use of transistors as impulse generators operating in the avalanche mode is well known and is described in many textbooks.

I claim:

1. A method of testing a section of transmission line including the following steps:
    applying a succession of impulses of very short duration relative to the interval between the impulses to one end of the section of line,
    deriving a succession of output signals from the same or the other end of the section of line, the interval between the impulses being such that substantially all output signals resulting from one impulse will have occurred before the next impulse is applied to the section of line,
    producing variably time delayed replicas of the impulses applied to the section of line,
    forming the products of the output signals with the replicas of the respective impulses from which they are derived,
    integrating the products arising from a plurality of replicas subject to the same delay time to produce a smoothed correlation of the output signals and the delayed replicas of the impulses for each of a plurality of delay times, and
    examining the smoothed correlations resulting from the integration for peaks representing echoes resulting from transmission of the impulses along the section of line.

2. A method according to claim 1 wherein the duration of each of the impulses is of the order of 1 ns.

3. A method according to claim 1 wherein a plurality of impulses is applied to the section of line for each of a succession of discrete values of the variable delay applied to the replicas of the impulses and the integration of the products is effected by the summing of values representing the products of the output signals and the replicas corresponding to a particular delay time to produce a total value.

4. A method according to claim 3 wherein the total values are plotted against the corresponding delay times to produce a correlation curve.

5. A method according to claim 4 wherein the number of impulses applied to the section of line for each discrete value of the delay time applied to the replicas of the impulses is of the order of 65,000.

6. A method according to claim 1 wherein the output signals are derived from the other end of the section of line and the correlations corresponding to delay times greater than a predetermined value more than the transmission time of the section of line are subjected to a multiplication relative to the correlations corresponding to delay times which are less than said predetermined value more than the transmission time of the section of line.

7. Apparatus for testing a section of transmission line including means for connection to one end of the section for generating a succession of impulses of very short duration relative to the interval between the impulses, means for connection to an end of the section for deriving therefrom a succession of output signals corresponding respectively to the impulses, the interval between the impulses being such that substantially all of the output signals resulting from one impulse will have occurred before the next impulse is applied to the section of the line, means for producing replicas of the impulses applied to the section of line subject to an adjustable time delay, means for forming the products of the replicas of the impulses with corresponding output signals, means for integrating the products arising from a plurality of replicas subject to the same delay time to produce a smoothed correlation of the output signals with the delayed replicas of the impulses corresponding to each of a plurality of different time delays, and means for producing output indications representing the smoothed correlations.

8. Apparatus according to claim 7 wherein the pulses each have a duration of the order of 1 ns.

9. Apparatus according to claim 8 wherein the generating means includes a transistor operated in the avalanche mode.

10. Apparatus according to claim 7 wherein the means for producing replicas of the impulses subject to an adjustable time delay includes adjustable time delay means connected to impulse generating means whereby trigger signals applied to the means for generating a succession of impulses are applied to the adjustable time delay means to enable the impulse generating means to produce delayed replicas of the impulses.

11. Apparatus according to claim 10 wherein the adjustable time delay means is adjustable in discrete steps, and counting means connected to count the input signals is connected to adjust the time delay produced by the adjustable time delay means when a fixed plurality of impulses has been generated since the last adjustment of the time delay.

12. Apparatus according to claim 11 wherein the integrating means is arranged to integrate the products resulting from the impulses and the replicas subject to the same time delay.

13. Apparatus according to claim 7 wherein the means for producing output indications is an X-Y plotter in which the value of the time delay is applied to the plotter as one variable and the value of the correlation is applied to the plotter as the other variable.

14. Apparatus according to claim 7 wherein the integrating means is an analogue device, the products being in the form of electrical signals.

15. Apparatus according to claim 7 wherein the integrating means is a digital accumulator, the products being formed as digital signals.

16. Apparatus according to claim 7 wherein the means for deriving a succession of output signals from the section of transmission line is connected to the opposite end of the section to which the input signals are applied thereby to enable the forward echoes to be measured.

17. Apparatus according to claim 16 wherein means is provided for additionally multiplying the correlations produced at a predetermined time greater than the transmission time of the section of line.

18. Apparatus according to claim 7 wherein a reflectometer bridge is provided connected to the one end of the section of transmission line, the other end of the line being terminated by its characteristic impedance, the means for generating impulses being connected to apply the impulses to the transmission line via the reflectometer bridge, the output signals being derived from an output of the reflectometer bridge whereby return echo signals can be measured.

* * * * *